Oct. 1, 1957    R. C. LEGAT    2,807,849
BELT CONNECTION
Filed July 16, 1954
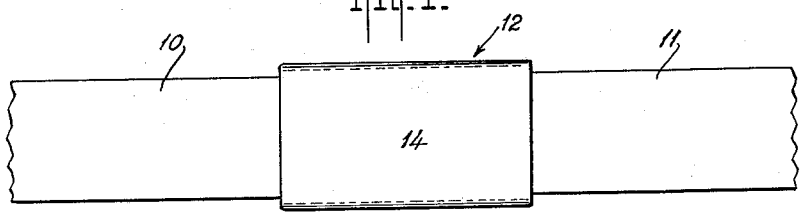
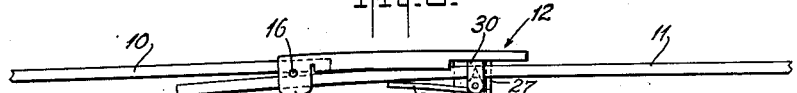
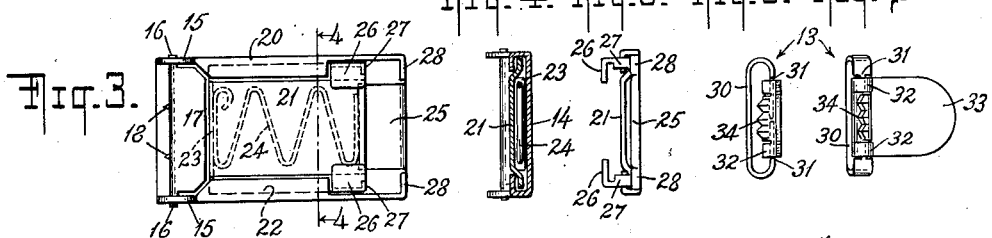
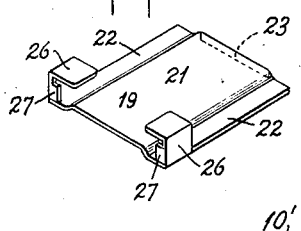
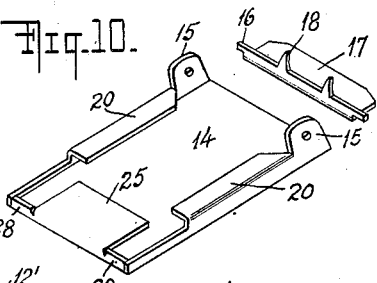
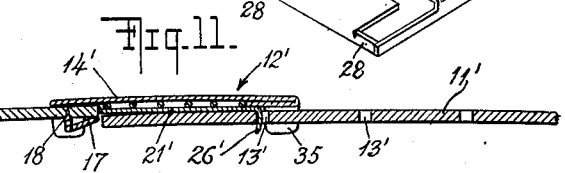
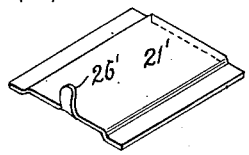
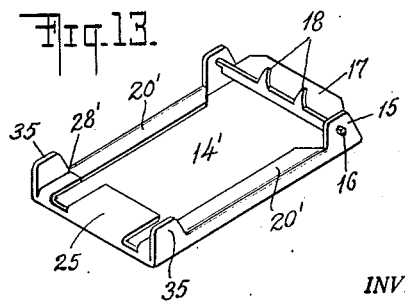
INVENTOR.
ROBERT C. LEGAT
BY
ATTORNEYS

United States Patent Office 2,807,849
Patented Oct. 1, 1957

2,807,849
BELT CONNECTION

Robert C. Legat, New Britain, Conn., assignor to G. E. Prentice Mfg. Co., Kensington, Conn., a corporation of Connecticut Application July 16, 1954, Serial No. 443,805

4 Claims. (Cl. 24—74)

This invention relates to adjustable devices for connecting the ends of belts or separate strap members forming part of a garment and has for its general object the provision of an improved device of this type.

A more particular object of the invention is to provide a belt connection of such simple construction that it may be readily and conveniently fabricated and assembled.

Another object of the invention is to provide a belt connection which may be readily and conveniently mounted and adjusted on belt ends and which will be simple to operate.

Other objects of the invention, as well as the advantages and novel features of construction thereof, will become apparent in the perusal of the following description when read in connection with the accompanying drawings, in which Fig. 1 is a front view of belt ends joined by an adjustable belt connection embodying the features of the invention;

Fig. 2 is a side view of the construction shown in Fig. 1;

Fig. 3 is a rear view of the front part of the belt connection;

Fig. 4 is a section taken along the line 4—4 of Fig. 3;

Fig. 5 is an end view of such front part looking toward the right hand end of Fig. 3;

Fig. 6 is an end view of the other part of the belt connection with the finger piece thereof in advanced position;

Fig. 7 is a front view of such other part with the finger piece thereof in retracted position;

Fig. 8 is a perspective detailed view of the slidable member in the front part of the belt connection;

Fig. 9 is a perspective view of the spring connected to the slidable member;

Fig. 10 is an exploded perspective view of the body portion of such front part;

Fig. 11 is a longitudinal sectional view of a modified form of the belt connection shown mounted on the ends of a belt;

Fig. 12 is a perspective view of the slidable member in such modified form, and

Fig. 13 is a perspective view of the body portion on which such slidable member is mounted.

In Figures 1 and 2 of the drawings, the reference numerals 10 and 11 designate the ends of a belt on which are mounted the belt connection parts designated generally by the numerals 12 and 13. The ends 10 and 11 of the belt or strap are both of a single uniform thickness throughout their lengths and may be made of leather, plastic or other suitable materials. The two belt ends also may be connected together in the form of the usual belt or strap, or may be separate parts forming part of a garment.

The connecting device or part 12 is removably attached to belt end 10, and is composed of a piece of sheet metal formed to provide a rectangularly-shaped body portion 14, the outer surface of which constitutes the face of the belt connection and may be suitably decorated. The body portion is provided at its inner end with a pair of inwardly extending ears 15, 15 between which the belt end 10 is received. The ears 15 are provided with aligned apertures through which extend the trunnions 16, 16 of a lever-like securing member 17 provided with teeth 18 (note Fig. 10), which enter into the material of belt end 10, to secure such end to the body portion 14. The construction and arrangement of the member 17 is such that the belt end 10 may be readily inserted between and withdrawn from between such member and the body portion 14 when the member 17 is in a raised or unlocked position. When such member 17 is pivoted to the position shown in Fig. 3 with the teeth in belt end 10 (note Fig. 11), any stress tending to separate the belt end from part 12 will only cause such member to grip the belt end more securely.

Integral with the side edges of the body portion 14 outwardly of the ears 15, is a pair of inturned elongated extensions 20, 20 forming guides for a spring loaded slidable member 21. The slidably supported member 21 which constitutes the rear plate of the connecting device 12, comprises two longitudinally extending side edges 22, 22 and a central raised portion 19 located between such side edges and the extensions 20. The side edges of member 21 are slidably received between the extensions 20 and the longitudinal side edge portions of the body 14, and the sides of the central raised portion of such member are in abutting relation with the inner edges of the extensions 20. The inner end of the central portion of member 21 is bent outwardly or toward the inner surface of the body portion 14 to form a seat 23 for one end of a serpentinely-shaped flat spring 24 located between such central raised portion and body portion 14. The raised central portion of member 21 in effect forms a pocket or housing for the spring 24. The other or outer end of spring 24 is seated against a shoulder which is provided in the space between the face plate 14 and the raised central portion 19 of the rear plate 21 and which is formed by the inner end of an inwardly bent extension 25 integral with the outer end of body portion 14. The extension 25 has a width less than the width of the raised central portion of member 21 and is bent flat against the inner surface of body portion 14, so that it may enter into the outer end of such raised central portion and offer no obstruction to the outward movement of member 21. The spring 24 normally maintains the member 21 in the position shown in Fig. 3 when no outward force is exerted on such member. When an outward force is exerted on member 21, the spring 24 will be squeezed in a longitudinal direction between seat 23 and extension 25 to yieldingly resist outward movement of such member.

Integral with the outer ends of the side edges 22, 22 of member 21 is a pair of ears 26, 26 which extend inwardly from such edges and then toward each other to embrace the sides of the connection part 13. Integral with the outer edges of ears 26, 26 are stops 27, 27 which together with such ears form sockets for receiving the sides or ends of the connection part 13. The outer end of the body portion 14 is inturned on each side of the extension 25 to form stops 28, 28 which coact with the outer ends of the side edges 22, 22 of member 21 and the stops 27, 27 of such member, to limit the outward movement of member 21 under an applied outward force.

The connection part 13 is adjustably attached to belt end 11 so that it is disposed transversely of the length of the belt and consequently is transverse of such belt end. The part 13 is composed of a strip 30 of suitable metal material having a rectangular cross-section and bent into the form of a substantially rectangularly-shaped band or loop. The opening of the band or loop has a width slightly greater than the thickness of the belt end 11 and a length slightly greater than the width of such belt end, so that the belt end 11 may be inserted or removed readily from such loop, and yet such band will snugly embrace such belt end. The opposed ends 31, 31 of the band 30 are reduced in section and are substantially circular in cross section to provide journals for the bearings 32, 32 formed on a finger piece 33. Between the bearings 32, 32, the finger piece is formed to provide teeth 34 which engage in the material of the belt end when the finger piece 33 is pivoted downwardly toward the end of belt end 11 and against the undersurface of the latter, as shown in Fig. 2 of the drawings. When so secured, the finger piece 33 will securely hold the band 30 in place on the belt end against forces tending to move it off such belt end. The part 13 however, may be adjusted readily on the belt end 11 by lifting the finger piece 33 to disengage the teeth 34, and then shifting the band 30 to the new position desired, after which the finger piece 33 is again pivoted to locking position.

It will be understood from the foregoing, that the parts 12 and 13 of the connection described, may be readily joined by inserting the outer ends of band 30 of part 13 into the sockets formed by the extensions 26 and stops 27 of member 21 in part 12 (note Fig. 2). In usage, any longitudinal force on the belt ends 10 and 11 will cause the member 21 to move outwardly against the yielding tension of spring 24 to a position where the longitudinal stress on the belt ends will be balanced by the built-up force in the spring 24. The member 21 may be moved from its normal position a distance of approximately one-half an inch before the edges 22, 22 thereof engage the stops 28, 28 to prevent any further movement of such member. This range of movement is believed to be sufficient for all normal requirements of needed give between the connected belt ends for a particular adjustment of the part 13 on the belt end 11. The parts may be readily disconnected by slipping the part 13 out of the sockets formed in part 12.

The above described belt connection may be readily adapted for use with a belt having an end provided with tongue apertures in the usual manner, thereby dispensing with the necessity of providing such end with a connecting part such as the previously described part 13. This form of the invention is shown in Figs. 11 to 13 of the drawings, in which 10' and 11' indicate the belt ends; belt end 11' being provided with spaced apertures 13' in the usual manner. The part 12' is similar in construction to the previously described part 12 except in the following particulars:

Instead of providing the member 21' with receiving sockets such as the sockets formed on member 21 by the extensions 26 and stops 27, such member 21' is provided at its outer end with a centrally located prong 26' which is formed to engage in the apertures 13', and when so engaged to securely connect the belt end 11' to member 21' (note Fig. 11). The outer end of the body portion 14' of part 12' has inwardly extending ears 35 integral with the side edges thereof adjacent to the outer ends of the guide extensions 20', 20'. These ears 35 coact with the prong 26' to prevent pivotal movement of the belt end 11' on the prong and to maintain such belt end and the part 12' in proper relation while in use. In this construction also, the stops 23', 23' of body portion 14' have a width substantially the same as the guide extensions 20', 20' and extend to the outer ends of such extensions, so that such stops form a continuation of the guide extensions 20', 20'. Thus, guiding members will be in engagement with the entire lengths of the side edges 22', 22' of member 21' throughout the entire range of the movements of such member.

While I have described and illustrated preferred embodiments of my invention, it will be apparent to those skilled in the art that changes may be made therein without departing from the spirit of the invention or the scope of the appended claims.

I claim:

1. A connection for two flat end parts comprising a face plate to be superimposed on the flat end of one of said parts and a transverse member mounted on and transverse to the other of said parts, a pair of inwardly extending ears connected to the side edges of said plate at the inner end thereof and receiving therebetween the flat end of said one part, means between said ears and coactable with the latter to properly secure said plate to the flat end of said one part, a pair of ears positioned at the outer end of said plate at the sides thereof and having their free ends turned inwardly to enable such ears to embrace the outer ends of said transverse member mounted on said other part, the transverse member being removably insertable into such position at the inner side of said outer ears and the free ends of such ears being spaced apart to provide an opening through which such other part may be readily moved in flat condition when the transverse member is so inserted, stop means at the outer side of said outer ears for preventing insertion of the transverse member into the said position from the outer side of said outer ears and for retaining said transverse member in such embraced position between said outer ears against longitudinal forces tending to pull such transverse member outwardly through said outer ears, and said transverse member being formed to be detachably received by said outer ears with its ends embraced by the latter and being engageable with said stop means when so located with relation to said outer ears, and means for detachably securing said transverse member to said other end part.

2. A connection such as defined in claim 1, in which said stop means comprises a fixed stop member extending transversely of said plate, and in which the stop engageable transverse member is loop-shaped and is slidably mounted on said other end part, one of the sides of said loop-shaped member being of reduced cross sectional area, a finger piece pivotally mounted on such reduced portion of said member, and teeth provided on the pivoted end of said finger piece to engage the portion of said other part embraced by said loop-shaped member.

3. A connection for two flat end parts comprising a face plate to be superimposed on the flat end of one of said parts, means at one end of said plate to connect the latter to the flat end of said part, said face plate having a pair of inturned extensions along the side edges thereof and forming a pair of spaced longitudinally disposed guides in back of said plate, a rear plate slidably supported by said guides on the back of said face plate, said rear plate having side edge portions positioned between said guides and said face plate and a central raised portion located between said spaced guides and providing a space between such raised portion and said face plate, the inner end of said raised central portion being bent toward said face plate to provide a stop fixed with relation to said rear plate and located between said rear plate and said face plate at the inner end of the former, a member fixed with relation to said face plate and located on the back of said face plate between said guides in position to provide a shoulder in the space formed between said face plate and the raised central portion of said rear plate while enabling said rear plate to slide freely thereover towards the outer end of said face plate, a spring located in the space between such raised rear plate portion and said face plate and seated at its ends on said stop and said shoulder, and means on the outer end of said rear plate for connecting such plate to the other end part.

4. A connection for two flat end parts comprising a face plate to be superimposed on the flat end of one of said parts, and a transverse member mounted on and transverse to the other of said parts, a pair of inwardly extending ears connected to the side edges of said plate at the inner end thereof and receiving therebetween the flat end of said one part, means between said ears and coactable with the latter to properly secure said plate to the flat end of said one part, said face plate having a pair of inturned extensions along the side edges thereof and forming a pair of spaced longitudinally disposed guides in back of said plate, said guides extending outwardly from said ears to points short of the outer end of said face plate, a rear plate slidably supported by said guides on the back of said face plate, said rear plate having side edge portions positioned between said guides and said face plate and a central raised portion located between said spaced guides and providing a space between such raised portion and said face plate, the inner end of said raised central portion being bent toward said face plate to provide a stop fixed with relation to said rear plate and located between said rear plate and said face plate at the inner end of the former, a turned under extension on the outer end edge of said face plate contacting the under side of such plate and positioned between such guides to extend into the space between said rear plate and said face plate, a spring located in the space between said raised rear plate portion and said face plate and seated at its ends on said stop and the inner end of said end extension, a pair of ears positioned on the side edge portions of said rear plate beyond the outer ends of said face plate guides and having their free ends turned inwardly to enable such ears to embrace the outer ends said transverse member mounted on said other part, the transverse member being removably insertable into such position at the inner side of said outer ears and the free ends of such ears being spaced apart to provide an opening through which such other part may be readily moved in flat condition when the transverse member is so inserted, stop means at the outer side of said outer ears for preventing insertion of the transverse member into the said position from the outer side of said outer ears and for retaining said transverse member in such embraced position between said outer ears against longitudinal forces tending to pull such transverse member outwardly through said outer ears, said transverse member being formed to be detachably received by said outer ears with its ends embraced by the latter and being engageable with said stop means when so located with relation to said outer ears, and means for detachably securing said transverse member to said other end part.

References Cited in the file of this patent
UNITED STATES PATENTS

| | | |
|---|---|---|
| 1,463,172 | Newman | July 31, 1923 |
| 1,659,705 | Roehr | Feb. 21, 1928 |
| 2,156,647 | Zeman | May 2, 1939 |
| 2,203,270 | O'Brien | June 4, 1940 |
| 2,609,577 | Beyer | Sept. 9, 1952 |

FOREIGN PATENTS

| | | |
|---|---|---|
| 457,889 | Great Britain | Dec. 8, 1936 |